(12) United States Patent
Kim

(10) Patent No.: US 12,292,809 B2
(45) Date of Patent: May 6, 2025

(54) STORAGE DEVICE FOR STORING TEMPERATURE LOG INFORMATION ACCORDING TO TEMPERATURE STORAGE LEVEL AND OPERATING METHOD THEREOF

(71) Applicant: SK hynix Inc., Icheon (KR)

(72) Inventor: Chi Eun Kim, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 18/316,087

(22) Filed: May 11, 2023

(65) Prior Publication Data

US 2024/0202090 A1  Jun. 20, 2024

(30) Foreign Application Priority Data

Dec. 19, 2022  (KR) .................. 10-2022-0178341

(51) Int. Cl.
*G06F 11/00* (2006.01)
*G06F 11/07* (2006.01)
*G06F 11/30* (2006.01)

(52) U.S. Cl.
CPC ........ *G06F 11/3034* (2013.01); *G06F 11/076* (2013.01); *G06F 11/3058* (2013.01); *G06F 11/3075* (2013.01)

(58) Field of Classification Search
CPC .............. G06F 11/3034; G06F 11/076; G06F 11/3058; G06F 11/3075
See application file for complete search history.

(56) References Cited

U.S. PATENT DOCUMENTS

| | | | |
|---|---|---|---|
| 8,374,823 B1 | 2/2013 | Williams | |
| 10,027,534 B1* | 7/2018 | Mahapatra | .......... H04L 43/0817 |
| 11,989,445 B2* | 5/2024 | Golov | .................. G06F 11/3037 |
| 12,055,988 B1* | 8/2024 | Nikafrooz | ............... G06F 1/206 |
| 12,067,280 B2* | 8/2024 | Dar | ........................ G06F 3/0608 |
| 2011/0225347 A1* | 9/2011 | Goss | .................... G06F 12/0246 |
| | | | 711/170 |
| 2013/0145076 A1* | 6/2013 | Chiueh | ............... G06F 12/0246 |
| | | | 711/E12.008 |
| 2019/0278510 A1* | 9/2019 | Kaynak | .................... G06F 3/0619 |
| 2020/0073451 A1* | 3/2020 | Nowell | ................ G11C 11/5628 |
| 2022/0066899 A1* | 3/2022 | Sloat | .................... G06F 12/0868 |
| 2022/0228925 A1* | 7/2022 | Palmer | ............... G05B 19/0428 |
| 2023/0367378 A1* | 11/2023 | Vaysman | ............... G06F 1/3221 |
| 2023/0393976 A1* | 12/2023 | Tang | ...................... G06F 3/0652 |
| 2023/0418475 A1* | 12/2023 | Shukla | .................... G06F 3/0679 |
| 2024/0134531 A1* | 4/2024 | Vankamamidi | ........ G06F 3/0685 |

FOREIGN PATENT DOCUMENTS

KR  1020090129622 A  12/2009
KR  1020220050697 A  4/2022

* cited by examiner

*Primary Examiner* — Loan L. T. Truong

(57) ABSTRACT

A storage device may store temperature log information in one or more log memory blocks according to a temperature storage level and determine the temperature storage level based on a temperature change amount over time of a temperature of the storage device. By storing the temperature log information less frequently when smaller changes in the temperature are expected than when larger changes are, efficiency of storing the temperature log information may be improved.

16 Claims, 12 Drawing Sheets

STORAGE DEVICE FOR STORING TEMPERATURE LOG INFORMATION ACCORDING TO TEMPERATURE STORAGE LEVEL AND OPERATING METHOD THEREOF

CROSS-REFERENCE TO RELATED APPLICATION

The present application claims priority under 35 U.S.C. 119(a) to Korean patent application number 10-2022-0178341 filed on Dec. 19, 2022, which is incorporated herein by reference in its entirety.

TECHNICAL FIELD

The embodiments of the present disclosure relate to a storage device for storing temperature log information according to a temperature storage level and an operating method thereof.

BACKGROUND

A storage device is a device for storing data based on a request from an external device such as a computer, a mobile terminal such as a smart phone or tablet, or various electronic devices.

The storage device may further include a controller for controlling memory (e.g. volatile memory/non-volatile memory). The controller may receive a command from an external device, and execute or control operations to read, write, or erase data in the memory included in the storage device based on the input command.

The temperature of a storage device may change over time. Log information indicating a change in temperature of the storage device over time may be used as an important factor in analyzing a failure which occurs in the storage device later. However, if the log information is stored in the memory whenever the temperature of the storage device changes, the size of the log information stored in the memory may be excessively large.

SUMMARY

Embodiments of the disclosure may provide a storage device and an operating method thereof capable of efficiently storing temperature log information according to the temperature change of the storage device.

In one aspect, embodiments of the disclosure may provide a storage device including (i) a memory including a plurality of memory blocks, and (ii) a controller configured to store, according to a temperature storage level, temperature log information indicating a temperature of the storage device in one or more log memory blocks among the plurality of memory blocks, and determine the temperature storage level based on a temperature change amount over time of the storage device.

In another aspect, embodiments of the disclosure may provide an operating method of a storage device including (i) determining a temperature change amount over time of the storage device, (ii) determining a temperature storage level based on the temperature change amount over time of the storage device, and (iii) storing temperature log information indicating a temperature of the storage device in one or more log memory blocks according to the temperature storage level.

According to embodiments of the present disclosure, it is possible to efficiently store the temperature log information according to the temperature change of the storage device.

DETAILED DESCRIPTION

Figure 1:
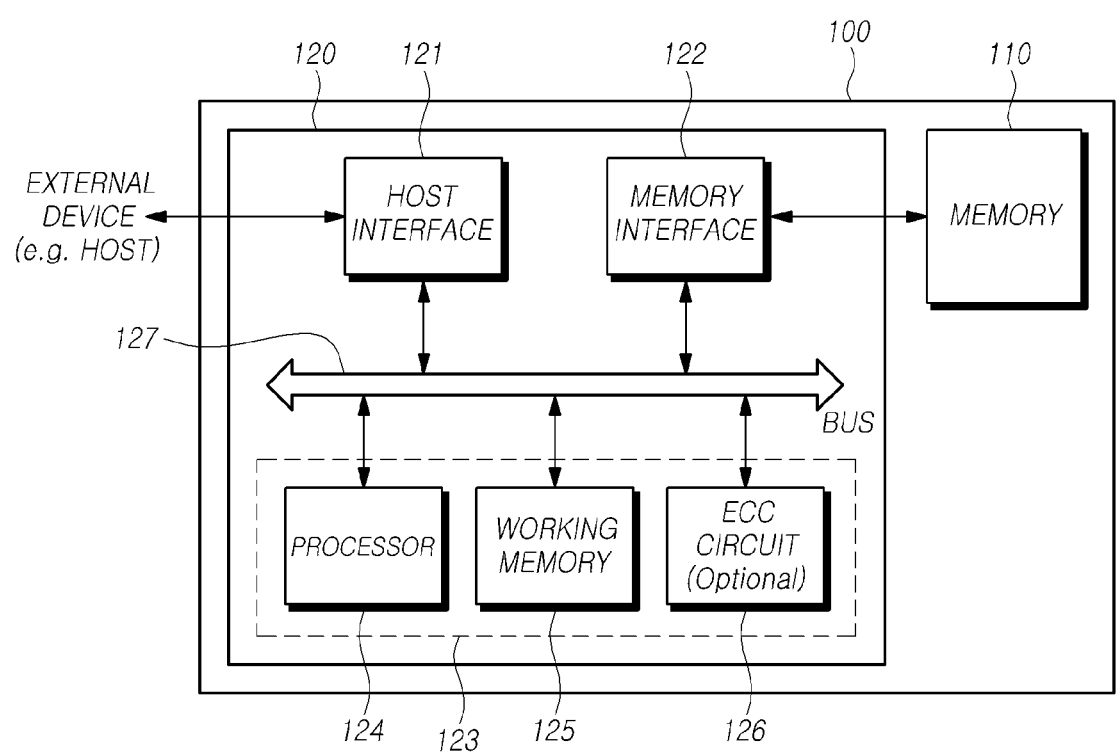
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings; however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the FTL. The FTL may receive the LBA and translate the LBA into the PBA using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implemented using a processor 124 that executes firmware in which the corresponding operation is defined, but embodiments are not limited thereto.

Firmware, as a program to be executed in the storage device 100 to drive the storage device 100, may include various functional layers. For example, the firmware may include binary data in which codes for executing the functional layers, respectively, are defined.

For example, the firmware may include at least one from among an FTL, which performs a translating function between a logical address requested to the storage device 100 from the host and a physical address of the memory 110; a host interface layer (HIL), which serves to analyze a command requested to the storage device 100 as a storage device from the host and transfer the command to the FTL; and a flash interface layer (FIL), which transfers a command, received from the FTL, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware in which a logic calculation to be performed is defined is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of read data when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in the most recently read data. There may be one or more sectors that are determined to be uncorrectable. The error detection and correction circuit 126 may transfer information (e.g., address information) regarding a sector which is determined to be uncorrectable to the processor 124.

A bus 127 may be configured to provide communication between the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
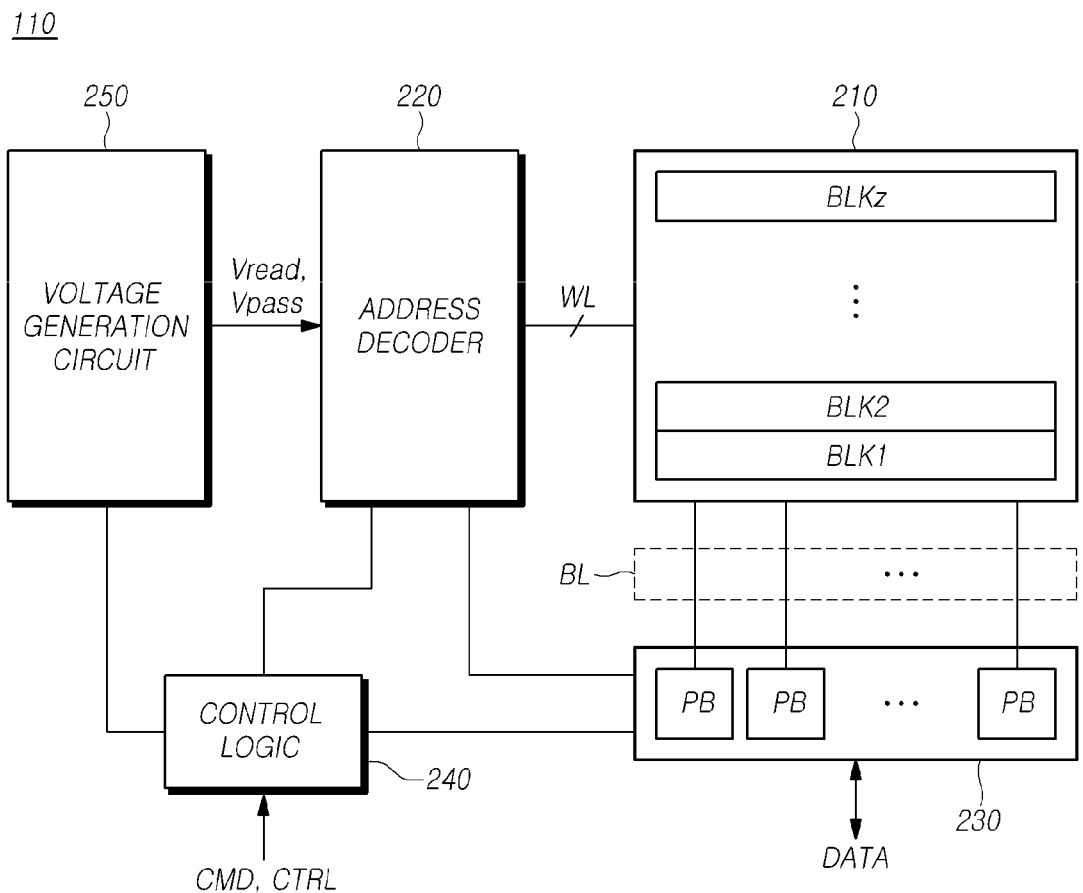
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and writhe circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
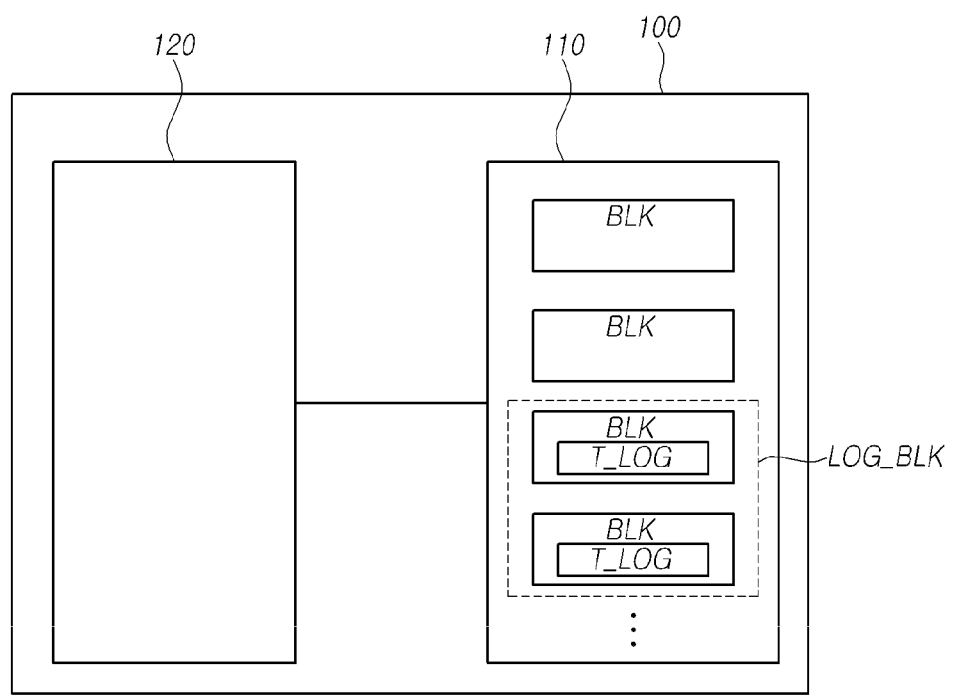
FIG. 3 illustrates a structure of a storage device according to embodiments of the present disclosure.

FIG. 3 illustrates a structure of a storage device 100 according to embodiments of the present disclosure.

The storage device 100 may include a memory 110 and a controller 120.

The memory 110 may include a plurality of memory blocks BLK. In this case, each of the plurality of memory blocks BLK may include a plurality of pages.

The controller 120 may store temperature log information T_LOG indicating a temperature of the storage device 100 in one or more log memory blocks LOG_BLK among a plurality of memory blocks BLK.

In embodiments of the present disclosure, the log memory blocks LOG_BLK may be selected in various manners.

For example, the log memory blocks LOG_BLK may be memory blocks for storing metadata (e.g., map information and journal information). The controller 120 may store metadata, which is data indicating information about user data stored in the memory 110, in the log memory blocks LOG_BLK. The controller 120 stores metadata in log memory blocks LOG_BLK when a special event (e.g., an uncorrectable ECC (UECC), a program status failure (PSF), a sudden power-off (SPO), and/or the like) occurs during runtime.

The temperature log information T_LOG may be stored in the same memory block as other metadata.

The temperature of the storage device 100 may be measured by one or more temperature sensors (not shown) included in the storage device 100. Each of the temperature sensors may measure the temperature of a specific area or a specific component (e.g., memory 110 or controller 120) of the storage device 100 and transmit the measured temperature information to the controller 120. The controller 120 may use the measured temperature as a reference value for controlling (e.g., throttling) the operation of the controller 120.

The temperature log information T_LOG may include information about temperatures over time of components included in the storage device 100. For example, the temperature log information T_LOG may include information about the temperature of the controller 120, information about temperatures of a plurality of memory dies (not shown) included in the memory 110, or both.

In addition, the controller 120 may manage a temperature storage level indicating a condition related to storing the temperature log information T_LOG in the log memory blocks LOG_BLK. Hereinafter, this will be described in detail in FIG. 4.

Figure 4:
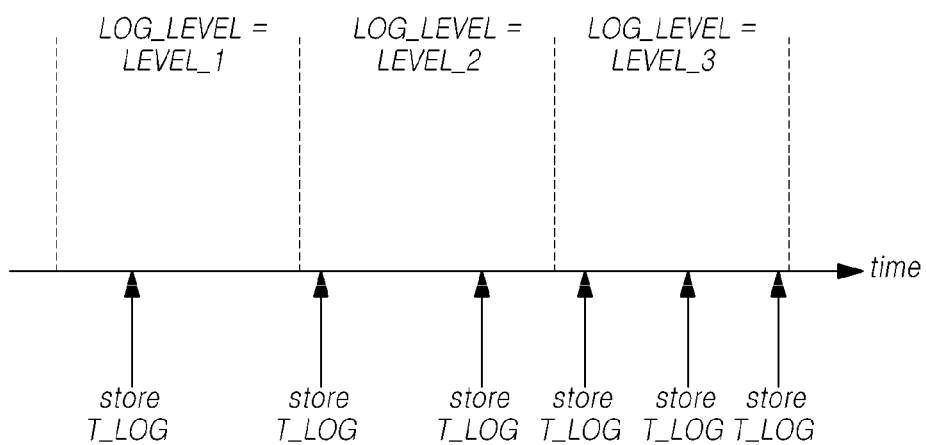
FIG. 4 illustrates an operation of storing temperature log information according to a temperature storage level in a storage device according to embodiments of the present disclosure.

FIG. 4 illustrates an operation of storing temperature log information T_LOG according to a temperature storage level LOG_LEVEL in a storage device 100 according to embodiments of the present disclosure.

In FIG. 4, the controller 120 may change the temperature storage level LOG_LEVEL to a first level LEVEL_1, a second level LEVEL_2, or a third level LEVEL_3. In FIG. 4, there is described the case where the temperature storage level LOG_LEVEL is the first level LEVEL_1, the second level LEVEL_2 or the third level LEVEL_3 as an example, but the number of possible temperature storage levels LOG_LEVEL is not limited to the example shown in FIG. 4.

The conditions for storing the temperature log information T_LOG in the log memory blocks LOG_BLK may vary according to the temperature storage level LOG_LEVEL. Accordingly, the frequency at which the temperature log information T_LOG is stored in the log memory blocks LOG_BLK may vary according to the temperature storage level LOG_LEVEL.

Referring to FIG. 4, the controller 120 may store the temperature log information T_LOG with a higher frequency in a case in which the temperature storage level LOG_LEVEL is the second level LEVEL_2 than a case in which the temperature storage level LOG_LEVEL is the first level LEVEL_1. Similarly, the controller 120 may store the temperature log information T_LOG with a higher frequency in a case in which the temperature storage level LOG_LEVEL is the third level LEVEL_3 than a case in which the temperature storage level LOG_LEVEL is the second level LEVEL_2.

In embodiments of the present disclosure, the controller 120 of the storage device 100 may determine a temperature storage level LOG_LEVEL indicating a condition in which the temperature log information T_LOG is stored in the log memory blocks LOG_BLK based on a temperature change amount over time of the storage device 100. Hereinafter, this will be described in detail in FIG. 5. In embodiments, the temperature change amount over time corresponds to a difference between a temperature of the storage device 100 at an end of a set time period and the temperature of the storage device 100 at a beginning of the time period.

Figure 5:
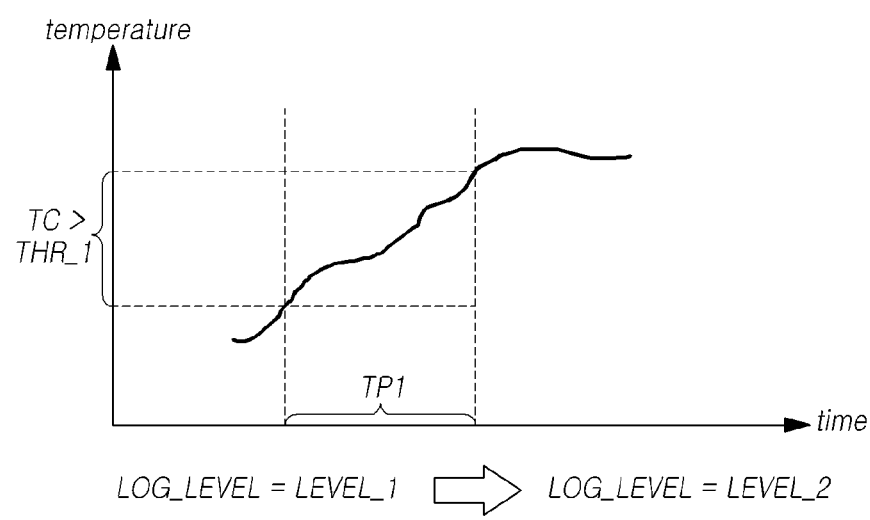
FIG. 5 illustrates an operation of changing a temperature storage level from a first level to a second level by a storage device according to embodiments of the present disclosure.

FIG. 5 illustrates an operation of changing a temperature storage level LOG_LEVEL from a first level LEVEL_1 to a second level LEVEL_2 by a storage device 100 according to embodiments of the present disclosure.

Referring to FIG. 5, the controller 120 of the storage device 100 may change a temperature storage level LOG_LEVEL from a first level LEVEL_1 to a second level LEVEL_2 if the temperature change amount TC of the storage device 100 is greater than a first threshold change amount THR_1 during a first period TP1 when the temperature storage level LOG_LEVEL is the first level LEVEL_1. If the temperature change amount TC of the storage device 100 during the first period TP1 is greater than the first threshold change amount THR_1, the controller 120 determines that the temperature change is large, and may change the temperature storage level LOG_LEVEL, thereby increasing a frequency for recording the temperature log information T_LOG. Accordingly the controller 120 may more efficiently store the temperature log information T_LOG by recording the temperature log information T_LOG more frequently when a temperature change amount of the storage device 100 is expected to be large.

Conversely, the controller 120 may change the temperature storage level LOG_LEVEL from the second level LEVEL_2 to the first level LEVEL_1 if the temperature change amount TC of the storage device 100 during the first period TP1 is smaller than the first threshold change amount THR_1 when the temperature storage level LOG_LEVEL is the second level LEVEL_2.

Hereinafter, a difference in the operation of the storage device 100 according to the temperature storage level LOG_LEVEL will be described with reference to FIGS. 6 and 7.

Figure 6:
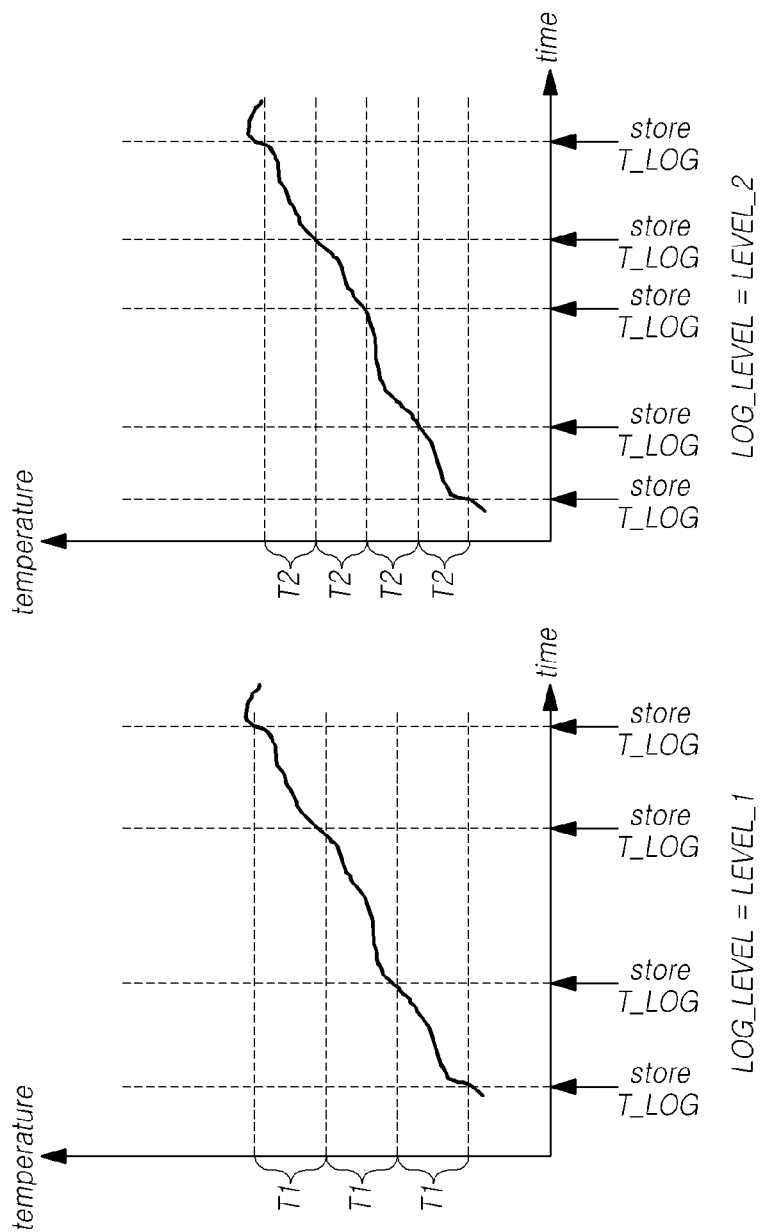
FIG. 6 illustrates a comparison of the cases in which a temperature storage level of a storage device is a first level and a second level according to an embodiment.

FIG. 6 illustrates a comparison of the cases in which a temperature storage level LOG_LEVEL of a storage device 100 is a first level LEVEL_1 and a second level LEVEL_2 according to an embodiment.

In the embodiment of FIG. 6, when the temperature storage level LOG_LEVEL is the first level LEVEL_1, the controller 120 of the storage device 100 may store the temperature log information T_LOG in the log memory blocks LOG_BLK whenever the temperature of the storage device 100 changes by a first value T1.

Also, when the temperature storage level LOG_LEVEL is the second level LEVEL_2, the controller 120 may store the temperature log information T_LOG in the log memory blocks LOG_BLK whenever the temperature of the storage device 100 changes by a second value T2.

In this case, the second value T2 may be smaller than the first value T1. That is, the controller 120 stores the temperature log information T_LOG even when a smaller temperature change occurs in the case that the temperature storage level LOG_LEVEL is the second level LEVEL_2. As a result, the temperature log information T_LOG may be stored with a higher frequency when the temperature storage level LOG_LEVEL is the second level LEVEL_2 than when the temperature storage level LOG_LEVEL is the first level LEVEL_1.

Figure 7:
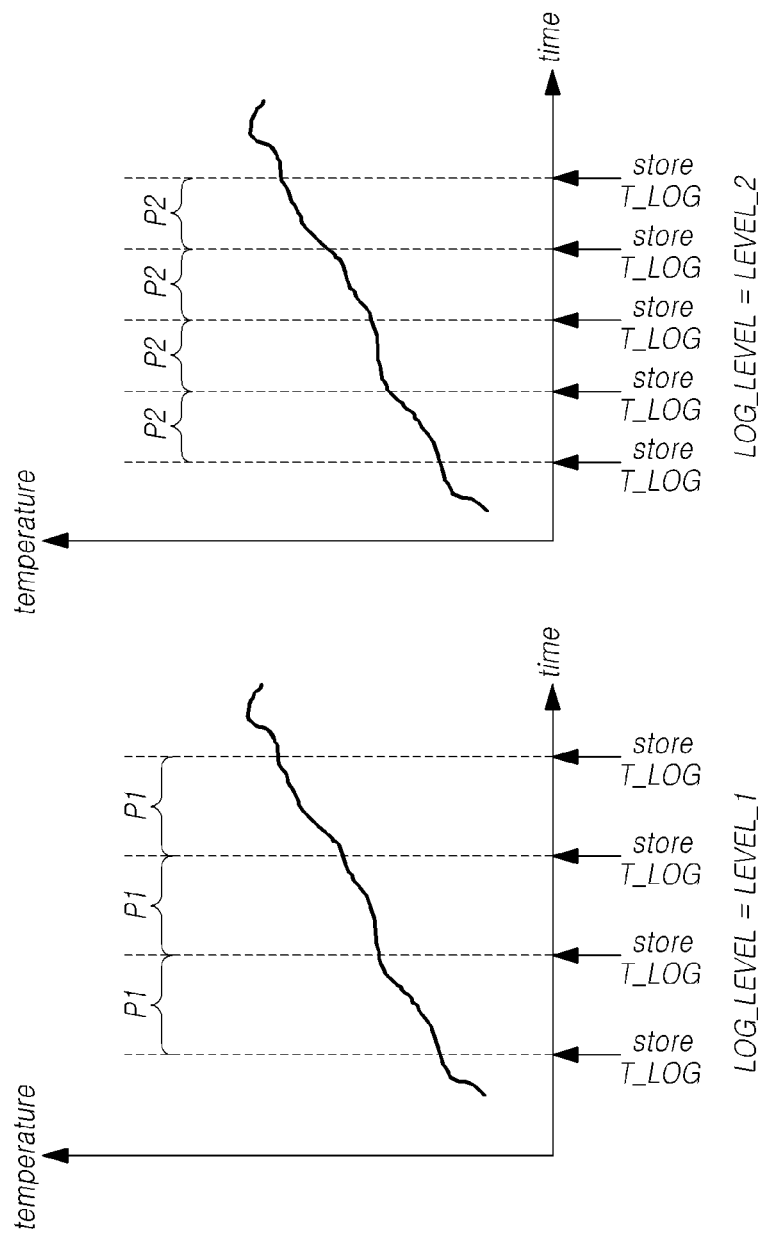
FIG. 7 illustrates a comparison of the cases in which a temperature storage level of a storage device is a first level and a second level according to another embodiment.

FIG. 7 illustrates a comparison of the cases in which a temperature storage level LOG_LEVEL of a storage device is a first level LEVEL_1 and a second level LEVEL_2 according to another embodiment.

In the embodiment of FIG. 7, when the temperature storage level LOG_LEVEL is the first level LEVEL_1, the controller 120 of the storage device 100 may set a period for storing the temperature log information T_LOG in the log memory blocks LOG_BLK as a first period P1.

Also, when the temperature storage level LOG_LEVEL is the second level LEVEL_2, the controller 120 may set a period for storing the temperature log information T_LOG in the log memory blocks LOG_BLK to a second period P2.

In this case, the second period P2 may be shorter than the first period P1. That is, the controller 120 may store the temperature log information T_LOG at a higher frequency when the temperature storage level LOG_LEVEL is the second level LEVEL_2 than when the temperature storage level LOG_LEVEL is the first level LEVEL_1.

In the above, a case where the temperature storage level LOG_LEVEL is the first level LEVEL_1 and a case where the temperature storage level LOG_LEVEL is the second level LEVEL_2 have been compared.

Hereinafter, a comparison of cases in which the temperature storage level LOG_LEVEL is the second level LEVEL_2 and is the third level LEVEL_3 is described.

Figure 8:
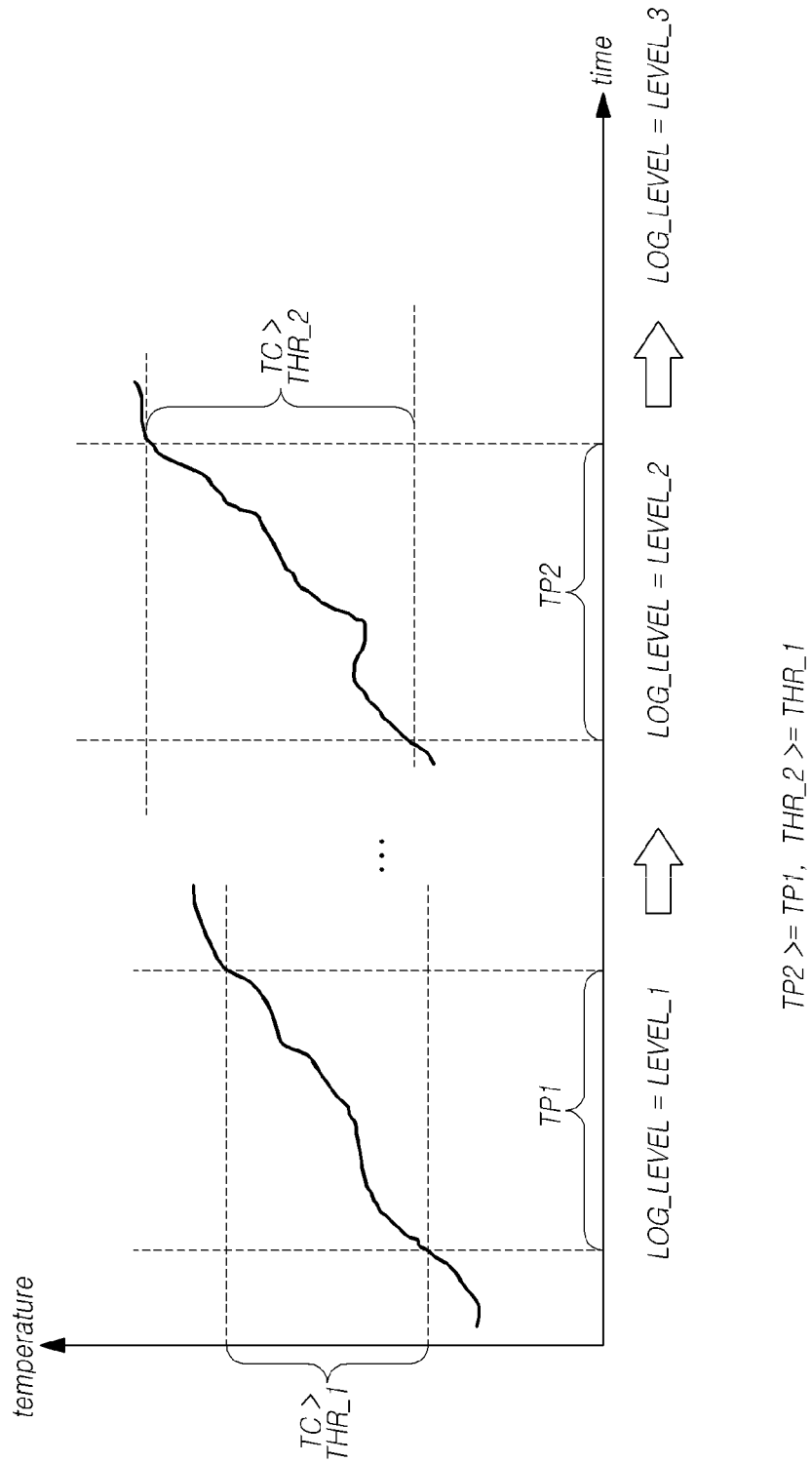
FIG. 8 illustrates an operation of changing a temperature storage level from a second level to a third level by a storage device according to embodiments of the present disclosure.

FIG. 8 illustrates an operation of changing a temperature storage level LOG_LEVEL from a second level LEVEL_2 to a third level LEVEL_3 by a storage device according to embodiments of the present disclosure.

Referring to FIG. 8, the controller 120 of the storage device 100 may change a temperature storage level LOG_LEVEL from the second level LEVEL_2 to a third level LEVEL_3 when the temperature storage level LOG_LEVEL is the second level LEVEL_2 and the temperature change amount TC of the storage device 100 during a second period TP2 is greater than a second threshold change amount THR_2.

For example, a length of the second period TP2 may be greater than or equal to a length of the first period TP1, and the second threshold change amount THR_2 may be greater than or equal to the first threshold change amount THR_1.

As another example, the length of the second period TP2 may be greater than the length of the first period TP1, and the second threshold change amount THR_2 may be greater than the first threshold change amount THR_1.

As another example, the length of the second period TP2 may be smaller than the length of the first period TP1, and the second threshold change amount THR_2 may be greater than the first threshold change amount THR_1.

Conversely, the controller 120 of the storage device 100 may change a temperature storage level LOG_LEVEL from the third level LEVEL_3 to the second level LEVEL_2 when the temperature storage level LOG_LEVEL is the third level LEVEL_3 and the temperature change amount TC of the storage device 100 during the second period TP2 is smaller than the second threshold change amount THR_2.

Hereinafter, a difference in the operation of the storage device 100 according to the temperature storage level LOG_LEVEL will be described with reference to FIGS. 9 and 10.

Figure 9:
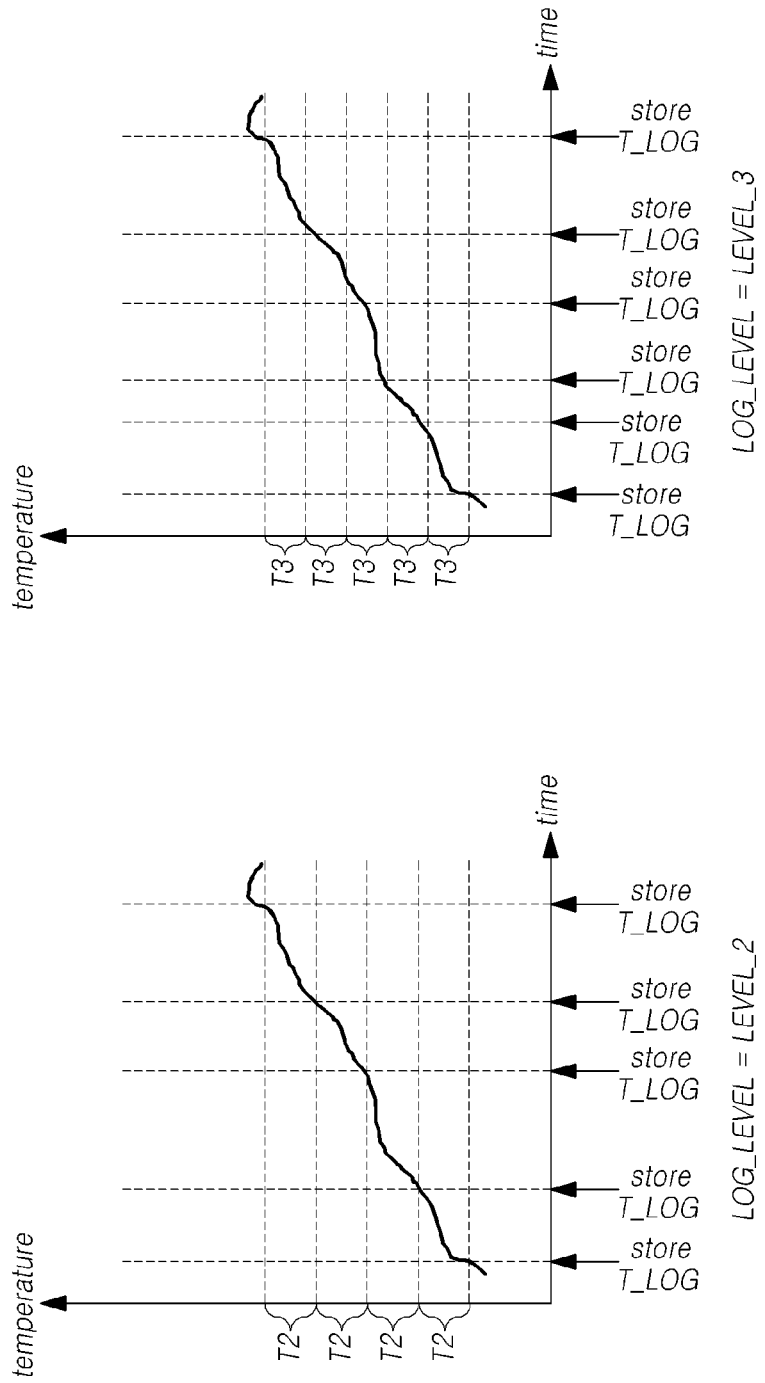
FIG. 9 illustrates a comparison of the cases in which a temperature storage level of a storage device according to embodiments of the present disclosure is a second level and a third level according to an embodiment.

FIG. 9 illustrates a comparison of the cases in which a temperature storage level LOG_LEVEL of a storage device 100 according to an embodiment of the present disclosure is a second level LEVEL_2 and a third level LEVEL_3.

In the embodiment of FIG. 9, when the temperature storage level LOG_LEVEL is the second level LEVEL_2, the controller 120 of the storage device 100 may store the temperature log information T_LOG in the log memory blocks LOG_BLK whenever the temperature of the storage device 100 is changed by a second value T2.

In addition, when the temperature storage level LOG_LEVEL is the third level LEVEL_3, the controller 120 may store the temperature log information T_LOG in the log memory blocks LOG_BLK whenever the temperature of the storage device 100 is changed by a third value T3.

In an embodiment, the third value T3 may be smaller than the second value T2. That is, the controller 120 stores the temperature log information T_LOG even when a smaller temperature change occurs in the case that the temperature storage level LOG_LEVEL is the third level LEVEL_3. As a result, the temperature log information T_LOG may be stored with a higher frequency when the storage level LOG_LEVEL is the third level LEVEL_3 than when the temperature storage level LOG_LEVEL is the second level LEVEL_2.

Figure 10:
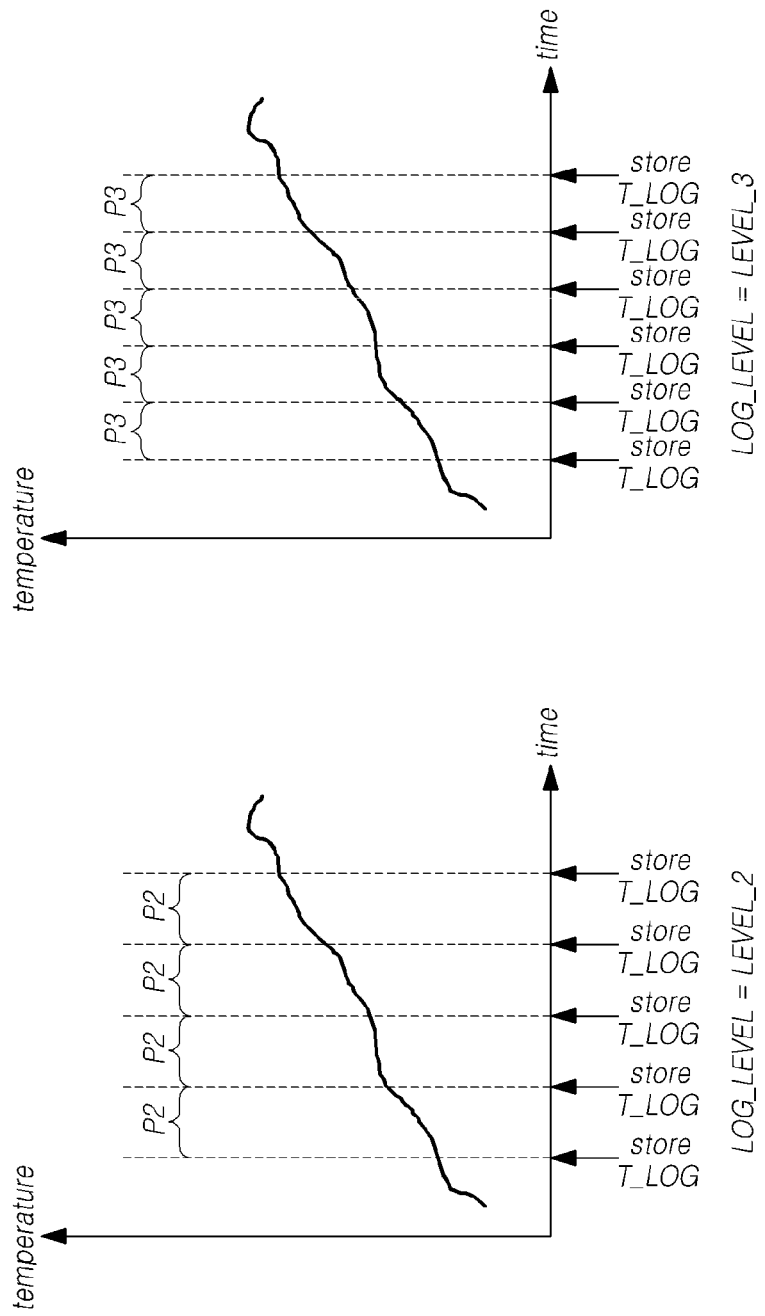
FIG. 10 illustrates a comparison of the cases in which a temperature storage level of a storage device according to embodiments of the present disclosure is a second level and a third level according to another embodiment.

FIG. 10 illustrates a comparison of the cases in which a temperature storage level LOG_LEVEL of a storage device 100 according to another embodiment of the present disclosure is a second level LEVEL_2 and a third level LEVEL_3.

In the embodiment of FIG. 10, when the temperature storage level LOG_LEVEL is the second level LEVEL_2, the controller 120 of the storage device 100 may set a period for storing the temperature log information T_LOG in the log memory blocks LOG_BLK as a second period P2.

Further, when the temperature storage level LOG_LEVEL is the third level LEVEL_3, the controller 120 may set a period for storing the temperature log information T_LOG in the log memory blocks LOG_BLK to a third period P3.

In this case, the third period P3 may be shorter than the second period P2. That is, the controller 120 may store the temperature log information T_LOG at a higher frequency when the temperature storage level LOG_LEVEL is the third level LEVEL_3 than when the temperature storage level LOG_LEVEL is the second level LEVEL_2.

Figure 11:
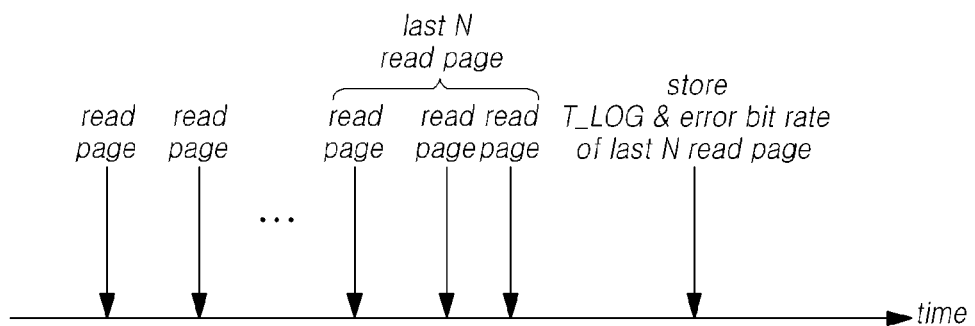
FIG. 11 illustrates an operation of storing error bit rate information together with temperature log information performed by a storage device according to embodiments of the present disclosure.

FIG. 11 illustrates an operation of storing error bit rate information together with temperature log information T_LOG by a storage device 100 according to embodiments of the present disclosure.

In the embodiment of FIG. 11, when storing the temperature log information T_LOG in the log memory blocks LOG_BLK, the controller 120 of the storage device 100 may store error bit rate information for N pages (N is a natural number) from which data has been most recently read in the memory 110 together with the temperature log information T_LOG in the log memory blocks LOG_BLK. The stored error bit rate information may be used to track an error bit rate according to the temperature change of the storage device 100.

In another embodiment, when storing the temperature log information T_LOG in the log memory blocks LOG_BLK, the controller 120 may additionally store information on a page which generated an uncorrectable ECC error in the log memory blocks LOG_BLK. The stored information may be used to track a UECC generation rate according to the temperature change of the storage device 100. In another embodiment, both error bit rate information and information on the page which generated the uncorrectable ECC error may be additionally stored when storing the temperature log information T_LOG.

Figure 12:
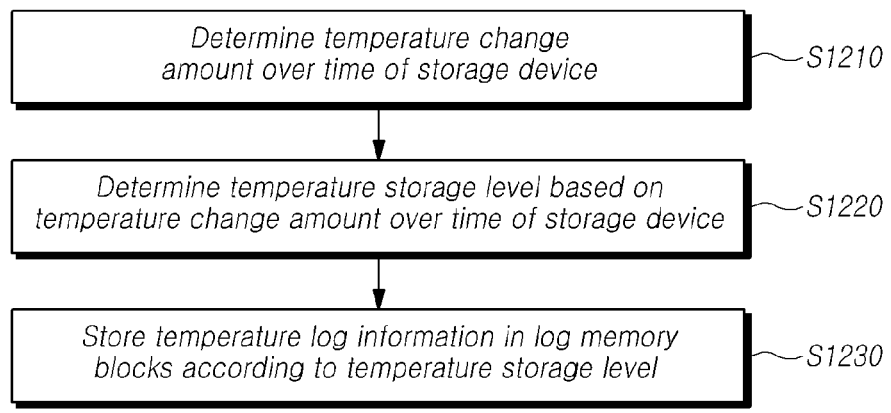
FIG. 12 illustrates an operating method of a storage device according to embodiments of the present disclosure.

FIG. 12 illustrates an operating method of a storage device 100 according to embodiments of the present disclosure.

The operating method of the storage device 100 may include determining a temperature change amount over time of the storage device 100 (S1210).

Further, the operating method of the storage device 100 may include determining a temperature storage level LOG_LEVEL indicating a condition for storing temperature log information T_LOG indicating a temperature of the storage device 100 in one or more log memory blocks LOG_BLK, based on the temperature change amount over time of the storage device 100 (S1220).

For example, in step S1220, in a state where the temperature storage level LOG_LEVEL is at a first level LEVEL_1, if the temperature change amount TC of the storage device 100 during the set first period TP1 is greater than the set first threshold change amount THR_1, the temperature storage level LOG_LEVEL may be changed from the first level LEVEL_1 to a second level LEVEL_2.

As another example, in step S1220, in a state where the temperature storage level LOG_LEVEL is at the second level LEVEL_2, if the temperature change amount TC of the storage device 100 during the set second period TP2 is greater than a set second threshold change amount THR_2, the temperature storage level LOG_LEVEL may be changed from the second level LEVEL_2 to a third level LEVEL_3. In this case, the length of the second period TP2 may be greater than or equal to the length of the first period TP1, and the second threshold change amount THR_2 may be greater than or equal to the first threshold change amount THR_1.

In addition, the operating method of the storage device 100 may include storing the temperature log information T_LOG in log memory blocks LOG_BLK according to the temperature storage level LOG_LEVEL (S1230). In an embodiment, the operating method of the storage device 100 may include additionally storing error bit rate information, information on a page which generates uncorrectable ECC errors, or both in the log memory blocks LOG_BLK when storing the temperature log information T_LOG.

For example, the step S1230 may include storing the temperature log information T_LOG in the log memory blocks LOG_BLK whenever the temperature of the storage device 100 is changed by a first value T1 when the temperature storage level LOG_LEVEL is the first level LEVEL_1, and storing the temperature log information T_LOG in the log memory blocks LOG_BLK whenever the temperature of the storage device 100 is changed by a second value T2 when the temperature storage level LOG_LEVEL is the second level LEVEL_2. In this case, the second value T2 may be smaller than the first value T1.

As an example, the step S1230 may include setting a period for storing the temperature log information T_LOG in the log memory blocks LOG_BLK as a first period P1 when the temperature storage level LOG_LEVEL is the first level LEVEL_1, and setting a period for storing the temperature log information T_LOG in the log memory blocks LOG_BLK as a second period P2 when the temperature storage level LOG_LEVEL is the second level LEVEL_2. In this case, the second period P2 may be shorter than the first period P1.

For example, the step S1230 may include storing the temperature log information T_LOG in the log memory blocks LOG_BLK whenever the temperature of the storage device 100 is changed by a second value T2 when the temperature storage level LOG_LEVEL is the second level LEVEL_2, and storing the temperature log information T_LOG in the log memory blocks LOG_BLK whenever the temperature of the storage device 100 is changed by a third value T3 when the temperature storage level LOG_LEVEL is the third level LEVEL_3. In this case, the third value T3 may be smaller than the second value T2.

For example, the step S1230 may include setting a period for storing the temperature log information T_LOG in the log memory blocks LOG_BLK as a second period P2 when the temperature storage level LOG_LEVEL is the second level LEVEL_2, and setting a period for storing the temperature log information T_LOG in the log memory blocks LOG_BLK as a third period P3 when the temperature storage level LOG_LEVEL is the third level LEVEL_3. In this case, the third period P3 may be shorter than the second period P2.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
   a memory including a plurality of memory blocks; and
   a controller configured to:
      store, according to a temperature storage level, which is used to determine when to store the temperature log information in the one or more memory blocks, temperature log information indicating a temperature of the storage device in one or more log memory blocks among the plurality of memory blocks, and
      determine the temperature storage level based on a temperature change amount over time of the storage device, the temperature change amount over time corresponding to a difference between a temperature of the storage device at an end of a time period and the temperature of the storage device at a beginning of the time period.

2. The storage device of claim 1, wherein the log memory blocks are memory blocks storing metadata.

3. The storage device of claim 1, wherein the controller changes the temperature storage level to a second level when the temperature storage level is a first level and the temperature change amount over a first period is greater than a first threshold change amount.

4. The storage device of claim 3,
   wherein the controller stores the temperature log information in the log memory blocks whenever the temperature of the storage device is changed by a first value when the temperature storage level is the first level,
   wherein the controller stores the temperature log information in the log memory blocks whenever the temperature of the storage device is changed by a second value when the temperature storage level is the second level, and
   wherein the second value is smaller than the first value.

5. The storage device of claim 3,
   wherein the controller sets a period for storing the temperature log information in the log memory blocks as a first period when the temperature storage level is the first level,
   wherein the controller sets the period for storing the temperature log information in the log memory blocks as a second period when the temperature storage level is the second level, and
   wherein the second period is shorter than the first period.

6. The storage device of claim 3, wherein the controller changes the temperature storage level from to a third level when the temperature storage level is a second level and the temperature change amount of the storage device during a second period is greater than a second threshold change amount,
   wherein a length of the second period is greater than or equal to the length of the first period, and
   wherein the second threshold change amount is greater than or equal to the first threshold change amount.

7. The storage device of claim 6,
   wherein the controller stores the temperature log information in the log memory blocks whenever the temperature of the storage device is changed by a second value when the temperature storage level is the second level,
   wherein the controller stores the temperature log information in the log memory blocks whenever the temperature of the storage device is changed by a third value when the temperature storage level is the third level, and
   wherein the third value is smaller than the second value.

8. The storage device of claim 6,
   wherein the controller sets a period for storing the temperature log information in the log memory blocks as a second period when the temperature storage level is the second level,
   wherein the controller sets the period for storing the temperature log information in the log memory blocks as a third period when the temperature storage level is the third level, and
   wherein the third period is shorter than the second period.

9. The storage device of claim 1, wherein the controller stores error bit rate information for N pages from which data has been most recently read in the memory together with the temperature log information in the log memory blocks, and the N is a natural number.

10. An operating method of a storage device comprising:
    determining a temperature change amount over time of the storage device, the temperature change amount over time corresponding to a difference between a temperature of the storage device at an end of a time period and the temperature of the storage device at a beginning of the time period;
    determining a temperature storage level based on the temperature change amount over time of the storage device; and
    storing temperature log information indicating a temperature of the storage device in one or more log memory blocks according to the temperature storage level,
    wherein the temperature storage level is used to determine when to store the temperature log information in the one or more memory blocks.

11. The operating method of claim 10, wherein determining the temperature storage level comprises changing the temperature storage level from a first level to a second level when the temperature change amount of the storage device during a first period is greater than a first threshold change amount.

12. The operating method of claim 11, wherein storing the temperature log information comprises:
    storing the temperature log information in the log memory blocks whenever the temperature of the storage device is changed by a first value when the temperature storage level is the first level, and
    storing the temperature log information in the log memory blocks whenever the temperature of the storage device is changed by a second value when the temperature storage level is the second level,
    wherein the second value is smaller than the first value.

13. The operating method of claim 11, wherein storing the temperature log information comprises:
    setting a period for storing the temperature log information in the log memory blocks as a first period when the temperature storage level is the first level, and
    setting the period for storing the temperature log information in the log memory blocks as a second period when the temperature storage level is the second level,
    wherein the second period is shorter than the first period.

14. The operating method of claim 11, wherein determining the temperature storage level comprises:
    changing the temperature storage level from the second level to a third level when the temperature change amount of the storage device during a second period is greater than a second threshold change amount,
    wherein a length of the second period is greater than or equal to the length of the first period, and
    wherein the second threshold change amount is greater than or equal to the first threshold change amount.

15. The operating method of claim 14, wherein storing the temperature log information comprises:
    storing the temperature log information in the log memory blocks whenever the temperature of the storage device is changed by a second value when the temperature storage level is the second level, and
    storing the temperature log information in the log memory blocks whenever the temperature of the storage device is changed by a third value when the temperature storage level is the third level,
    wherein the third value is smaller than the second value.

16. The operating method of claim 14, wherein storing the temperature log information comprises:
    setting a period for storing the temperature log information in the log memory blocks as a second period when the temperature storage level is the second level, and
    setting the period for storing the temperature log information in the log memory blocks as a third period when the temperature storage level is the third level,
    wherein the third period is shorter than the second period.

* * * * *